Figure 1:
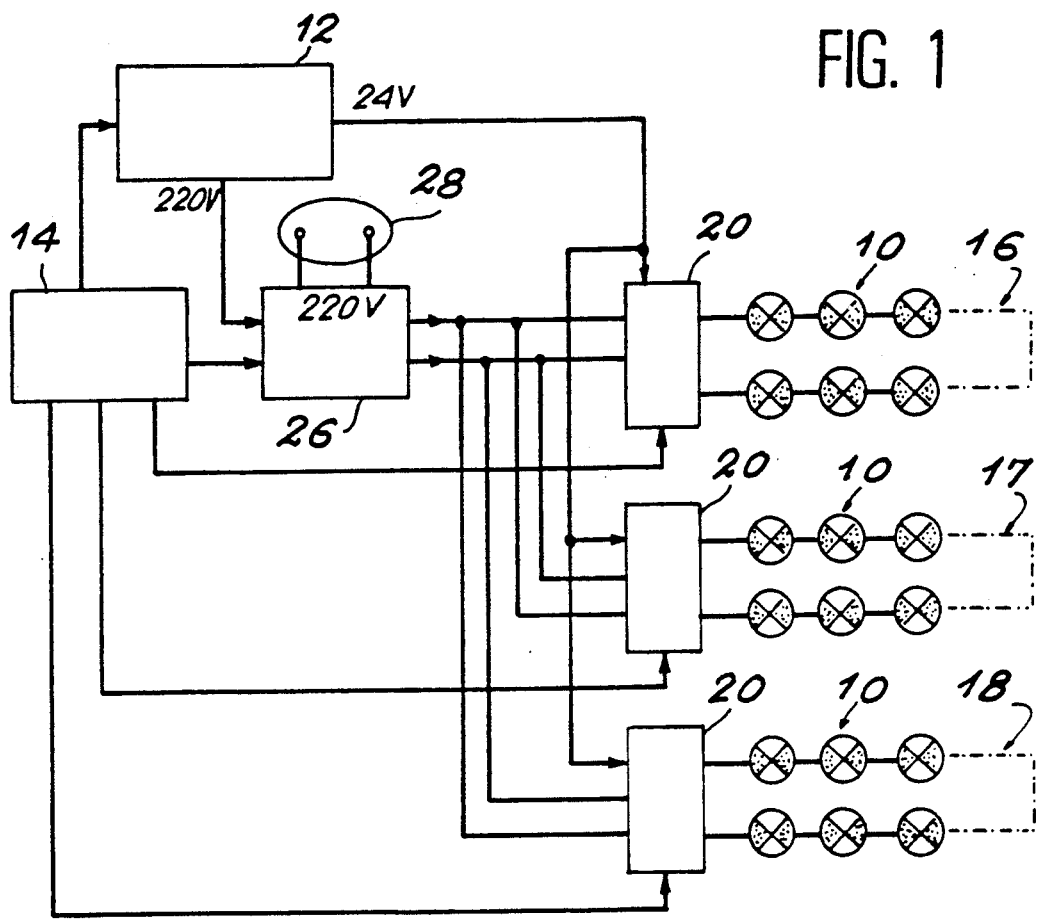

United States Patent [19]

Pouyanne et al.

[11] Patent Number: 5,032,961

[45] Date of Patent: Jul. 16, 1991

[54] GROUND LIGHT SYSTEM FOR A LANDING STRIP

[75] Inventors: Marc Pouyanne, Tahiti; Roger Mace, Mouroux; Jean-Loup Blanc, Velaux, all of France

[73] Assignees: Territoire de la Polynesie Francaise, Tahitisie, French Polynesia; a l'Energie Atomique Commissariat; Agence Francaise Pour la Maitrise De L'Energie, both of Paris, France

[21] Appl. No.: 485,127

[22] Filed: Feb. 26, 1990

[30] Foreign Application Priority Data

Feb. 27, 1989 [FR] France ................... 89 02485

[51] Int. Cl.[5] ............................................. F21V 23/04
[52] U.S. Cl. ...................................... 362/251; 362/20; 362/153.1; 362/234; 315/122; 340/953
[58] Field of Search ...................... 362/201, 21, 153.1, 362/183, 184, 157, 227, 234, 802, 251; 340/954, 956, 953; 315/122, 161

[56] References Cited

U.S. PATENT DOCUMENTS

| 2,924,748 | 2/1960 | Carlson | 315/122 |
| 3,715,741 | 2/1973 | McWade et al. | 340/953 |
| 4,727,291 | 2/1988 | Bavaro | 362/20 X |
| 4,755,804 | 7/1988 | Levati et al. | 362/20 X |

FOREIGN PATENT DOCUMENTS

| 1044964 | 11/1958 | Fed. Rep. of Germany . |
| 2195022 | 3/1974 | France . |
| 2494537 | 5/1982 | France . |
| 2509111 | 1/1983 | France . |
| 2602115 | 1/1988 | France . |

Primary Examiner—Stephen F. Husar
Attorney, Agent, or Firm—Michael N. Meller

[57] ABSTRACT

A ground light or beaconing system for a landing strip having at least one loop of lamps connected in series. Said loop is supplied by a solar cell, via a regulating circuit ensuring the preheating of the lamps while also maintaining a current flowing in the loop adapted to its operation.

3 Claims, 2 Drawing Sheets

GROUND LIGHT SYSTEM FOR A LANDING STRIP

DESCRIPTION

The present invention relates to a ground lighting or beaconing system for a landing strip. It more particularly applies to landing strips which are not frequently used and which are located in very sunny areas.

Large airports having a considerable amount of traffic are all provided with autonomous electric power supplies permitting the ground lights of the runways to operate as required, together with internal electrical equipment.

Conventionally small airfields not having regular traffic have generating sets supplying the electric power required for daily use, but, also, if appropriate, making it possible to light up the air strip beaconing system.

The ground lights consume a very large amount of power and lead to an overdimensioning of the generating sets and which are consequently all used most of the time. The electric power consumption is obviously dependent on the number of individual lights and their power rating involved in the beaconing system. The number of lights depends on the length of the landing strip.

For example, a power of 20 kW is generally available, whereas only 8 kW are required for the daily operation of the airfield. This overdimensioning becomes even more costly as the number of landings decrease, such as is often the case for numerous outback airstrips in Africa or certain Polynesian islands, where traffic essentially consists of hospital evacuation flights.

The object of the present invention is to utilize solar power in small airports located in very sunny regions.

More specifically, the invention relates to a ground light system comprising at least one loop of lamps connected in series, said loops being connected to an electric power supply. The latter is constituted by a solar cell supplying on an output a continuous signal and one regulating circuit per lamp loop. This regulating circuit is connected to the said cell and to the lamp loop associated with it. This circuit ensures a preheating of the lamps of the loop and also maintains a current flowing in the loop appropriate for the operation of the latter. The use of a solar cell involves a continuous electric state operation.

In a constructional variant, the system according to the invention comprises a switchover circuit, which can be connected to an alternative power supply. This circuit is connected to the solar cell and to each of the regulating circuits. In the case of unsatisfactory operation of the cell, it makes it possible to utilize a conventional alternative power supply.

In a constructional variant, in order to keep the current flowing in a loop, the regulating circuit has a circuit for comparing the intensity of the current with a fixed standard value, said comparator circuit minimizing any variation between the intensity and the standard value by adding resistances connected in series with the loop of lamps connected to said regulating circuit.

In a loop of lamps beaconing a landing strip, the burning out of one lamp in the loop can lead to an overvoltage at the terminals of the other lamps, which burn out in series. The regulation of the current in the loop, by adding the same number of resistances with a value equivalent to the internal resistance of a lamp as lamps out of use, makes it possible to obviate this disadvantage by permanently balancing the intensity of the current supplied.

Figure 3:
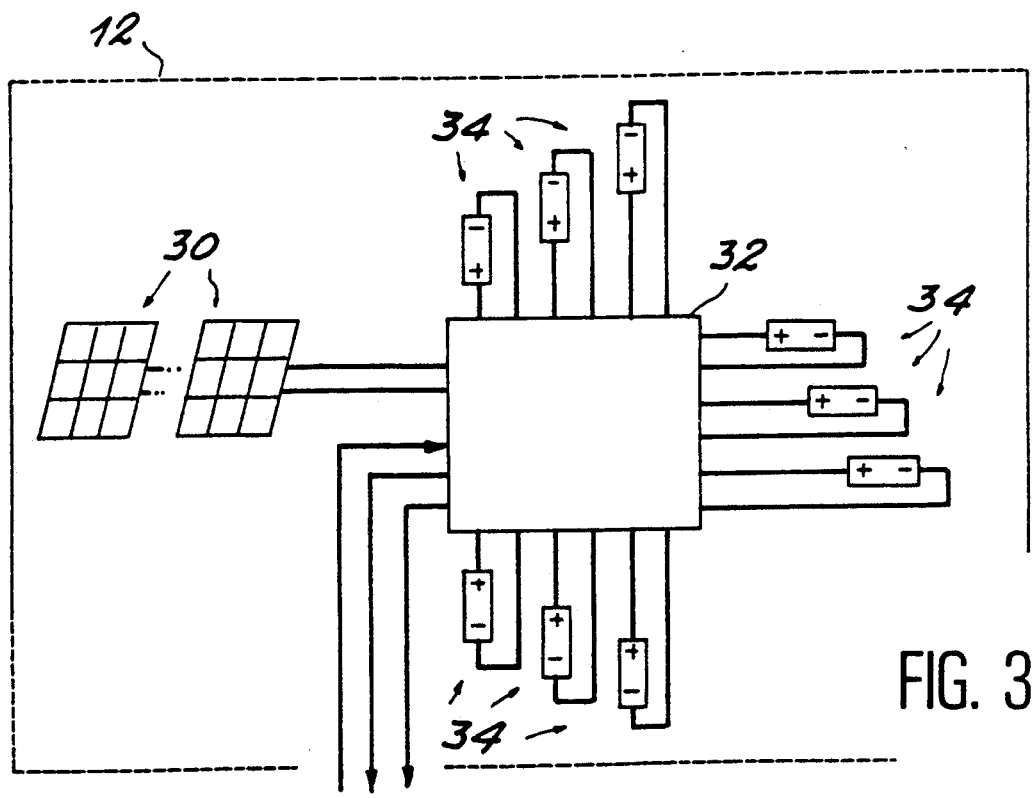
Figure 2:
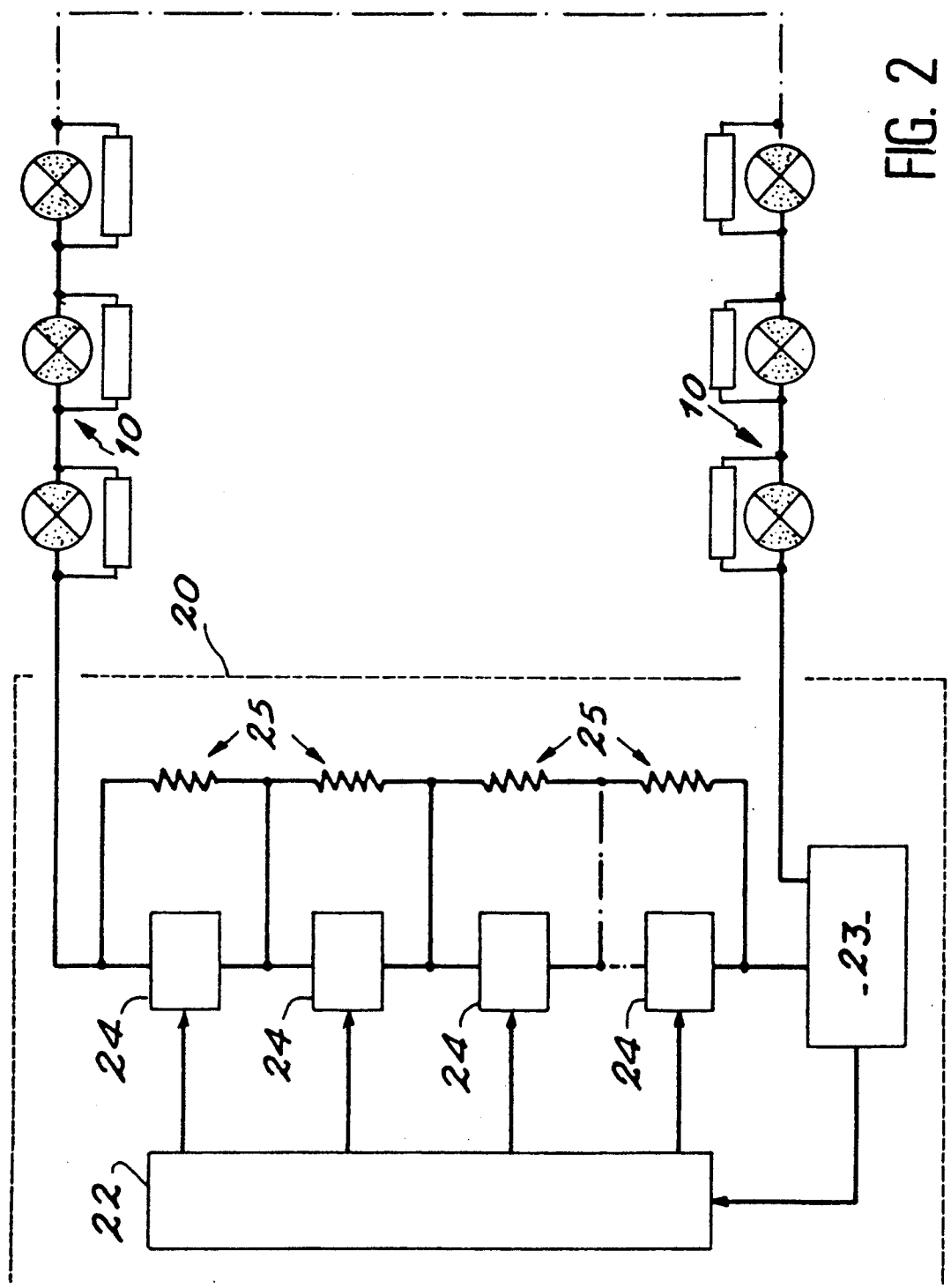

The invention is described in greater detail hereinafter relative to non-limitative embodiments and with reference to the attached drawings, wherein show:

FIG. 1 diagrammatically a system according to the invention. FIG. 2 diagrammatically a comparator circuit included in a regulating circuit for a system according to the invention. FIG. 3 diagrammatically a detail of a solar cell used in a system according to the invention.

FIG. 1 diagrammatically shows a system according to the invention. The power allowing the lighting up of the lamps 10 necessary for the beaconing of a landing strip is supplied by a solar cell 12. Details of the latter will be described hereinafter.

The complete system according to the invention is controlled by a control circuit 14. The latter controls the putting into operation of the loop or loops of lamps defining the airstrip so as to beacon the same.

In the particular case shown in FIG. 1, the beacon or ground light system consists of two loops 16,17. Each of these loops 16,17 has 35 lights, e.g. provided with globes, each of the lights being equipped with a 6 V lamp 10, which e.g. consumes 6 W.

The lamps 10 of a loop define the track and are connected in series to one another. The lamps of the loop 16 alternate with the lamps of the loop 17. Thus, if one loop of lamps fails, the airstrip is still illuminated by the loop continuing to function. The spacing between the lamps 10 is in accordance with the prescribed requirements. The length of the airstrip defines the number of lamps 10.

A third loop 18 has eight visual slope indicating lights (PAPI) and a luminous air sock. The visual slope indicator lights are equipped with 24 V lamps 10 consuming e.g. 70 W. Each light forming a loop is connected in parallel to a not shown short-circuiting relay. In the case of the non-operation of a lamp, the relay ensures the continuity of the connection to the other lamps of a loop.

Each of the loops 16,17,18 is connected to a regulating circuit 20, which, controlled by the control circuit 14, ensures the preheating of lamps 10 and then their putting into operation. In order to avoid any burning out of lamps caused by overvoltages, the intensity of the current flowing in the loop is maintained within a fixed range.

The regulating circuit 20 ensures the detection of an open loop and automatically interrupts the supply of the loop if the absence of current lasts longer than a predetermined time lag, e.g. 1 second. This function provides protection for working on the loop, e.g. for maintenance purposes.

The regulating circuit 20 automatically compensates any loss of charge (e.g. due to the burning out of one lamp) occurring in a loop.

FIG. 2 diagrammatically shows a comparator circuit included in a regulating circuit 20. This comparator circuit comprises a comparator 22 connected to relays 24. Each of the latter has a not shown switch connected in parallel to a resistor 25 having a value equal to the internal resistance of the lamps 10 of the loop. Each of the cells formed by a relay 24 and a resistor 25 are connected in series and are also connected in series with the lamp loop 10. The lamp loop 10 provided with the series-connected cells is connected to the remainder of the regulating circuit designated 23.

If a lamp 10 is out of use, the current in the loop increases. This current is compared with a reference value by comparator 22, which controls the opening or closing of a relay 24, so as to lower the current to its nominal operating value (approximately 1A for loops 16,17 and approximately 3A for loop 18 in exemplified manner).

The regulating circuits 20 also comprise a system for locating an insulation fault on the loop. This system is based on a Wheatstone bridge, whereof a first branch is constituted by the lamp loop 10 and a second branch by the two variable resistors (for forming a central zero galvanometer). It is possible to locate an insulation fault by prior calibration.

FIG. 1 shows that the solar cell 12 is connected to a switchover circuit 26. The latter is connected to an alternative power supply 28, which is only used in the case of an unsatisfactory operation or complete discharge of solar cell 12.

If the voltage supplied by solar cell 12 is not adequate for charging lamps 10, the switchover circuit 26 disconnects cell 12 and charges source 28. This switchover can also take place from the control circuit 14.

This operating mode implies that the regulating circuits 20 are able to receive an alternating or direct current. If the alternative power supply 28 supplies 220 V, the cell must also be able to supply 220 V in order to ensure compatibility.

FIG. 3 shows a solar cell 12 which can be used in a system according to the invention. Obviously the capacity of cell 12 is a function of the geographical location of the installation and also its frequency of use.

Cell 12 e.g. comprises six solar panels 30 in series and which can be of model BPX400 manufactured by Photowatt. The solar panels 30 are connected to a switching circuit 32 permitting the parallel charging of nine sets of twelve batteries 34, each supplying 24 V in exemplified manner. For discharge purposes, the solar cells are connected in series in order to supply 220 V (to within 4 V). These batteries can e.g. supply up to 50 Ah. Charging and discharging are controlled by control circuit 14.

The switching circuit 32 also makes it possible to supply on an output a voltage of 24 V, which is used for supplying the regulating circuits 20 (e.g. supply of all the active circuits of the regulating circuit 20, such as comparator 22).

During the putting into operation of the system according to the invention, an insulation test is controlled by control circuit 14 and is carried out from the switchover circuit 26.

A system according to the invention consequently makes it possible to avoid energy wastage through the use of solar energy for charging the batteries. The power supply of the beaconing system also makes it possible to supply the power necessary for the daily activity of the airfield (radio, lighting, etc.). In an indicative and non-limitative manner, a system according to the invention as described hereinbefore permits the landing or take off of one aircraft per day or four aircraft every three days.

What is claimed is:
1. A ground light system comprising:
 (a) at least one loop of lamps connected in series,
 (b) an electric power supply coupled to each loop of lamps for supplying electrical current thereto, said electric power supply comprising:
  (i) a solar cell adapted to supply a continuous electric current at an output thereof;
  (ii) for each loop, a regulating circuit coupled thereto for preheating said lamps of the loop associated therewith and maintaining a current flowing in said lamps adapted to the operation thereof, each regulating circuit being connected to said solar cell, whereby said loop of lamps of said ground light system are maintained in ready state condition for immediate service when necessary.

2. A ground light system according to claim 1, comprising:
 an alternative power supply,
 a switchover circuit for disconnecting said solar cell and connecting said alternative power supply to said regulating circuit associated with each loop, said switchover circuit being connected to said solar cell, said regulating circuit associated with each loop and to said alternative power supply.

3. A ground light system according to claim 1, in which said regulating circuit comprises:
 a comparator circuit for comparing the amplitude of the current flowing in the loop associated therewith with a fixed standard value, said comparator circuit minimizing any variation between the value of the current flowing in said loop and said standard value by selectively adding resistors connected in series with said loop of lamps connected to said regulating circuit.

* * * * *